United States Patent [19]

McMahon

[11] 4,302,835
[45] Nov. 24, 1981

[54] MULTIPLE TERMINAL PASSIVE MULTIPLEXING APPARATUS

[75] Inventor: Donald H. McMahon, Carlisle, Mass.

[73] Assignee: Sperry Corporation, New York, N.Y.

[21] Appl. No.: 114,914

[22] Filed: Jan. 24, 1980

[51] Int. Cl.³ .............................................. H04J 3/02
[52] U.S. Cl. ......................................... 370/4; 370/85; 340/825.54; 367/79
[58] Field of Search ...................... 370/4, 85; 340/150, 340/151, 152 T, 858; 455/605, 606; 367/20, 79

[56] References Cited

U.S. PATENT DOCUMENTS

| | | | |
|---|---|---|---|
| 3,990,036 | 11/1976 | Savit ...................................... | 370/85 |
| 3,996,553 | 12/1976 | Siems et al. ............................ | 370/85 |
| 4,089,584 | 5/1978 | Polczynski .............................. | 370/4 |
| 4,117,448 | 9/1978 | Siems ..................................... | 367/79 |

*Primary Examiner*—Douglas W. Olms
*Attorney, Agent, or Firm*—Howard P. Terry; Seymour Levine

[57] ABSTRACT

An apparatus for multiplexing a plurality of sensor signals onto a common transmission line without employing electrically active devices at each sensor. A modulated carrier signal is coupled to propagate along the common transmission line to a plurality of sensor terminals wherefrom portions of the carrier signal energy are coupled to the sensors for the inclusion of data signals and returned therefrom to propagate through a common transmission line to a common demodulator. Modulated carrier signals from each sensor are distinguished by providing a different round trip path length for each sensor, thus establishing unique round trip time delays. These time delays may be utilized with pulse amplitude modulation applied to the carrier signals and concomitant pulse amplitude modulated carrier signal returns that may be resolved by determining the time of arrival or with linear fm cw amplitude modulation applied to the carrier signal and concomitant delayed linear fm cw returns which may be resolved by determining a constant frequency difference between the linear fm cw signal applied to the carrier signal coupled to the transmission line and the linear fm cw signals returned from each sensor.

8 Claims, 5 Drawing Figures

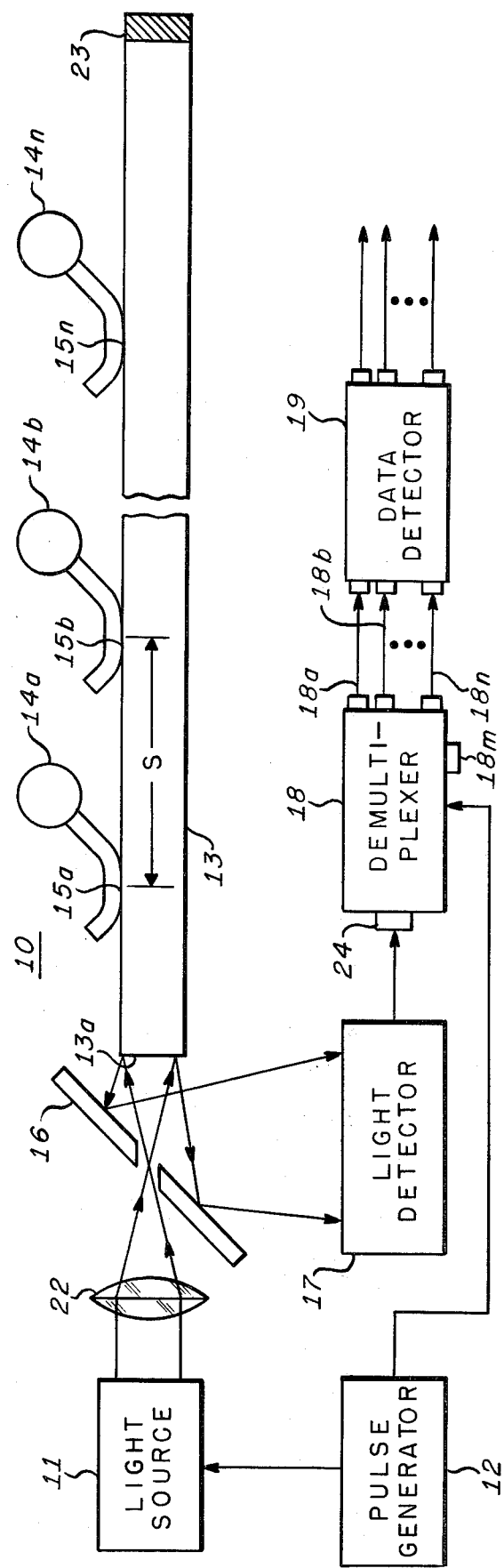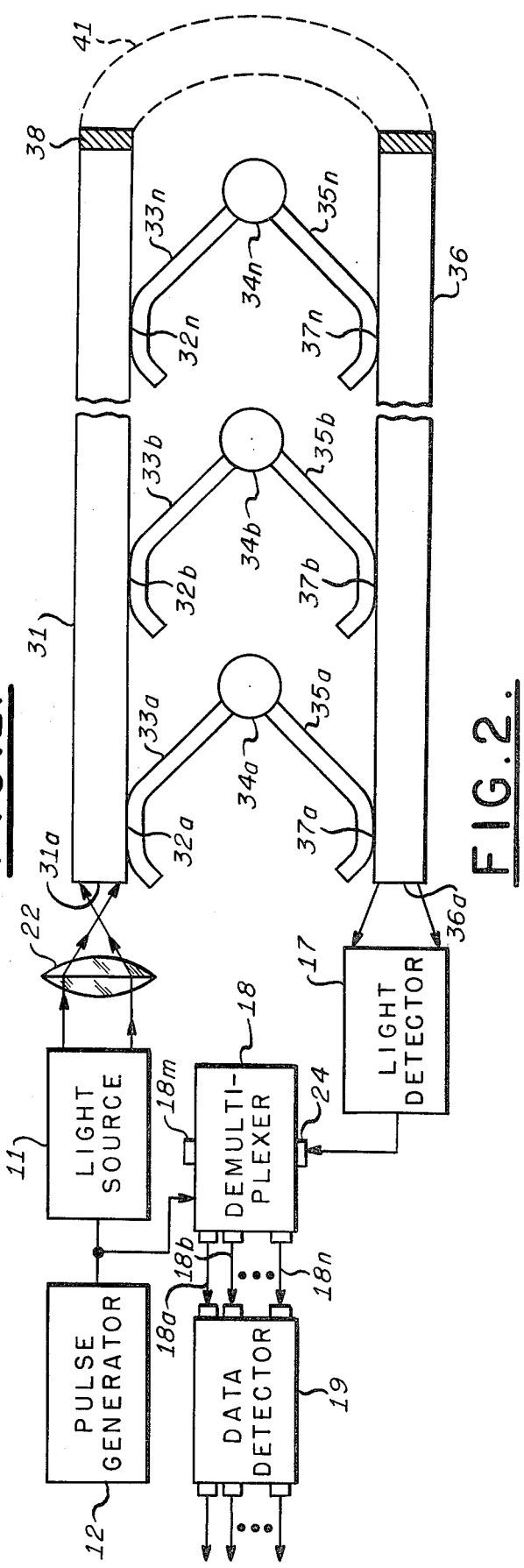

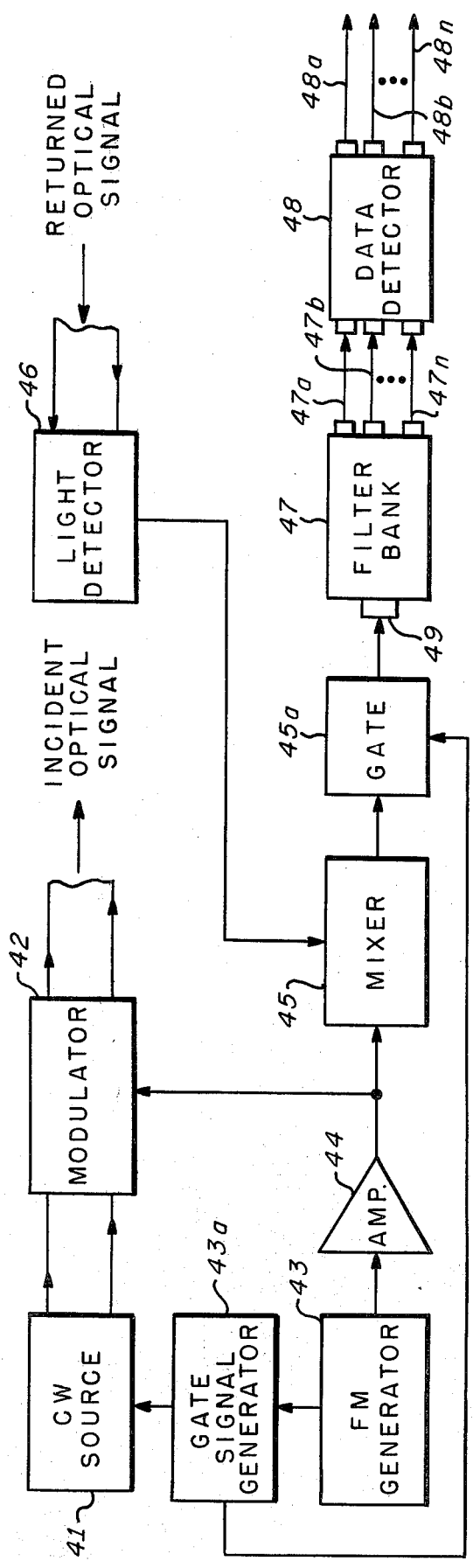
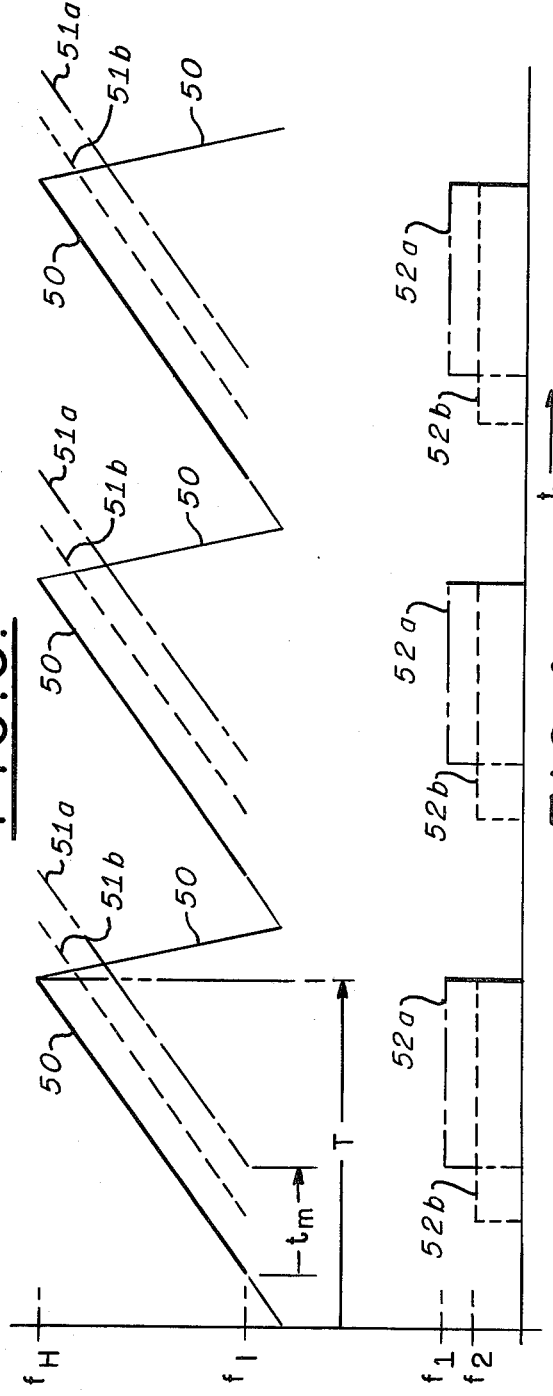
FIG. 3.
FIG. 4.

MULTIPLE TERMINAL PASSIVE MULTIPLEXING APPARATUS

BACKGROUND OF THE INVENTION

1. Field of the Invention

The present invention relates to multiplexing apparatus and methods and more particularly to passive multiplexing whereby a multiplicity of signals may be multiplexed without employing electrically active devices at the information generating terminals.

2. Description of the Prior Art

Underwater target locating systems may utilize active acoustic devices which comprise a radiation source and a receiver to detect reflected sound waves or passive devices which detect sound waves emanating from distance sources. The information obtained with active and passive systems is the same; mainly they determine a relative position of a multiplicity of dispersed discrete targets in a quiescent water ambient. Passive underwater locating systems are generally preferred for military applications. Since target position cannot be determined passively with a single acoustic receiver (hydrophone), a passive system requires a multiplicity of hydrophones, the minimum number being 3, one each positioned at the vertices of an equal angular triangle. These systems determine the relative position of a target by frequency filtering the target signal received at each sensor from the background noise, determining the relative signal phases at the sensors, and processing this phase information to obtain the relative range and angle location. Large numbers of hydrophones, 100 to 1000, are typically utilized in one or two dimensional arrays to provide sufficient signal sensitivity in the presence of ambient noise and to provide desired angular resolution over a broad acoustic frequency band.

In the prior art the hydrophones comprised piezolectric crystals to transform acoustic signals into electrical signals by converting pressure variations at the crystal into corresponding voltage variations across electrodes positioned on opposite sides of the crystal. These transducers typically supply very small voltages at very high output impedence levels. Generally each transducer is coupled to an amplifier in close proximity thereto which amplifies the signal and transforms the high output impedence of the transducer to a low output impedence which is coupled to the input terminals of a transmission line that, for example, may be a coaxial cable.

Acoustically passive hydrophone arrays are generally utilized for long distance covert sensing. Since the attenuation of acoustic waves in water increases rapidly with increasing frequency, the operating frequency band of an acoustically passive sensing array is generally limited to be within the range between 10 Hz to 10 KHz. The bandwidth capability of coaxial cable is significantly greater than 10 KHz, a characteristic that may be utilized to reduce the number of cables employed in the array. Coaxial cables exhibit signal attenuations of from 20 to 200 dB/Km for an operating bandwidth of 100 MHz and from 2 to 20 dB/Km for a bandwidth of 10 MHz. The ten MHz bandwidth would be preferred if the signals that propagate along the coaxial cable are of limited strength and the length of the cable exceeds 1 Km. With this cable bandwidth approximately one thousand 10 KHz bandwidth signals can be transmitted over the same cable. Electrical power for the transimpedence amplifiers and for multiplexing several acoustic sensors onto one transmission line must be transmitted through a sensor cable structure which must also contain the coaxial cable therewithin for returning the multiplexed signals to a common processing point. If the sensors are dispersed, transimpedence amplifiers must be located adjacent to each to establish sufficient signal to noise ratio for sensitive signal detection at the processing point. Coupling apparatus for injecting the amplified electrical signal from each transducer onto the coaxial cable without disturbing the signals from all the other transducers must also be provided. This coupling may be achieved with the utilization of the electrical signal generated at the output terminal of a transducer in response to a received acoustic signal to modulate a specific carrier signal at a frequency within the 10 MHz bandwidth and to couple this modulated carrier signal via a T junction and a tuned amplifier onto the coaxial cable. It is therefore apparent that acoustic sensor arrays are complicated systems comprising acoustical signal to electrical signal transducers, electronics for impedance conversion, electronics for multiplexing, cables for carrying power lines, coaxial cables for the propagation of electrical signals, and mechanical members for maintaining the various elements within a specified package.

The application of fiber optic technology has been investigated in an effort to simplify underwater target locating systems. One such application utilizes color as a means of multiplexing without requiring electrical power at the sensor location. In this system the emissions of a multiplicity of lasers, each operating at a distinct optical wavelength, are combined by a color (wavelength) multiplexer onto a common fiber. Filters (color demultiplexers) positioned at acousto-optic transducers, which are utilized as the hydrophones, couple each color to its assigned sensor. Modulated optical signals from the sensors are then coupled to the fiber (remultiplexed) whereon they propagate, jointly to a common receiving location whereat the colors are separated (demultiplexed) to provide individual hydrophone signals. This type of optical multiplexer employs one laser (light source), one detector, and at least one multiplexer unit for each sensor and is limited to low multiplexing ratios. Color multiplexing, moreover, does not effectively utilize the available channel capacity. These disadvantages cause the color multiplexer to be complex and expensive compared with alternative multiplexing systems. The present invention is directed to an electrically passive optical multiplexing system which is simple and inexpensive.

SUMMARY OF THE INVENTION

The present invention relates to a system for multiplexing a signal propagating along a transmission line to a multiplicity of sensors coupled thereto at sequential positions therealong and for multiplexing data modulated signals from each sensor onto this transmission line or onto another transmission line to return the data modulated signals to a common port whereat the modulated signals are demultiplexed on a time of arrival basis.

A signal, which may be an optical signal, is coupled to the transmission line from which portions of the signal are sequentially coupled to branch lines positioned along the transmission line for propagation to the sensors. At the sensors, the coupled signals are modulated in accordance with sensed data and returned to the transmission line whereon the data modulated signals sequentially propagate to the common port. Each signal path, from the source to a sensor to the common port, is chosen to establish a specific time delay which is different from all other time delays generated by signal paths to all other sensors.

This time delayed difference of the signals from each of the sensors is used to separate the signals upon arrival at the common port. Separation is accomplished either by pulse modulating the source signal to establish time separable return pulses from each of the sensors or to amplitude modulate the source signal with a frequency modulated signal for which the frequency variation is linear with respect to time and mixing the returned signals with the modulating signal to provide a separate frequency band for each sensor.

Within the scope of this invention, no electrical power need be used at the sensor or at the taps for multiplexing. Multiplexing is accomplished at the common port by noting the time of arrival or by detecting the frequency differences of the signals returned from the sensors.

BRIEF DESCRIPTION OF THE DRAWINGS

FIGS. 1 and 2 are block diagrams of preferred embodiments of the invention.

FIG. 3 is a block diagram of an illumination and demultiplexing system which may be utilized in the embodiments of FIGS. 1 and 2.

FIG. 4 presents waveforms useful in explaining the operation of the invention.

DESCRIPTION OF THE PREFERRED EMBODIMENTS

Figure 5:
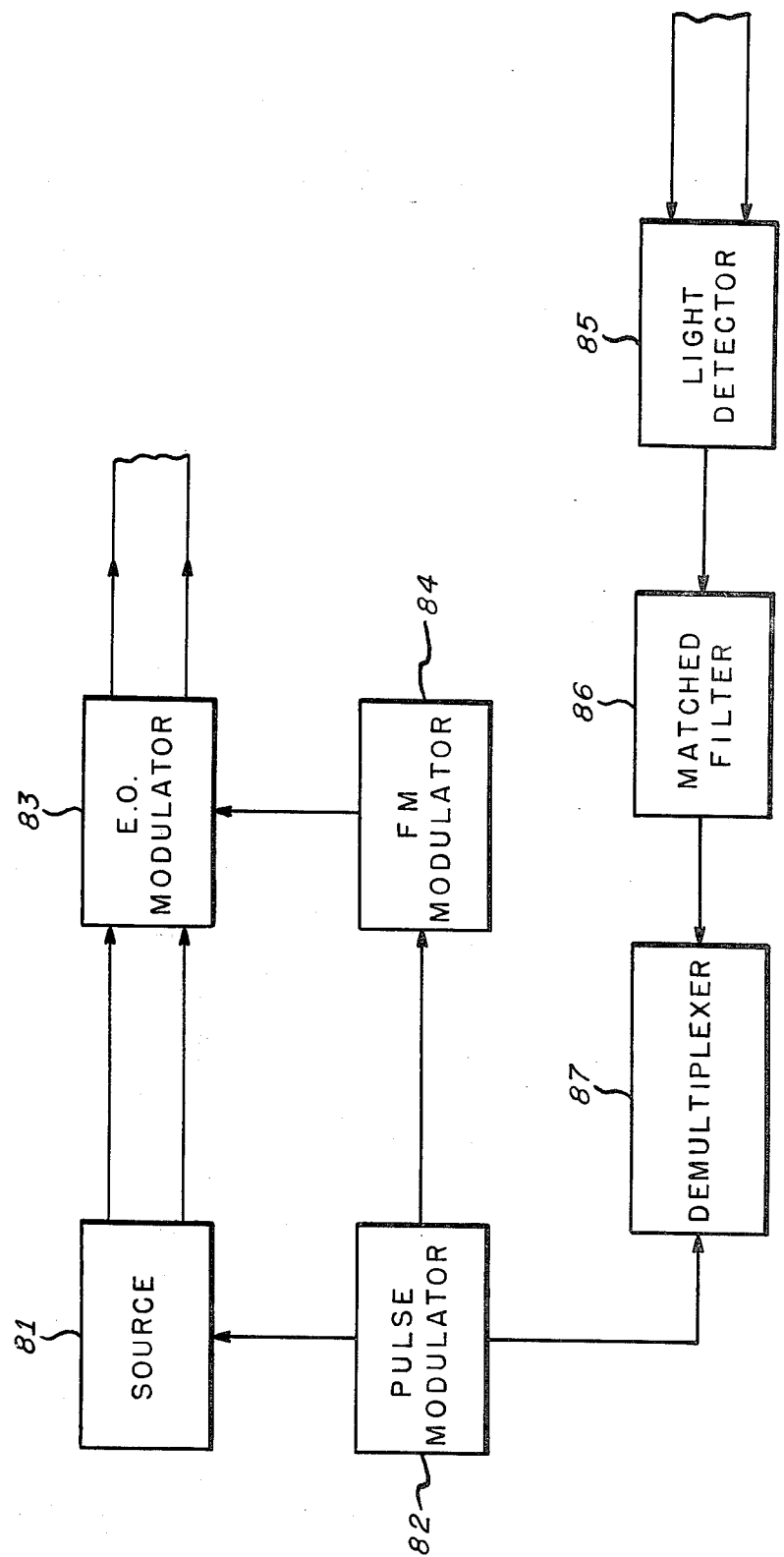
FIG. 5 is a block diagram of an illumination and demultiplexing system which may be utilized in the embodiments of FIGS. 2 and 3.

The transmission of a multiplicity of signals over a single transmission line may be realized by sequentially coupling each signal to propagate along the transmission line for an assigned epoch during which other signals do not propagate. Generally, this time division multiplexing is accomplished electronically by switchably coupling the signals to the transmission line in a sequential manner for propagation to a receiving location, where they are switchably separated in accordance with the arrival times and thereafter individually processed. Each signal propagates along the transmission line with equal speed thus maintaining the established time separation during transit to the receiving station. If a signal is coupled to a transmission line and devices which reflect signals incident thereto back towards the transmitting end are positioned at various locations along the transmission line, the reflections from these devices will arrive at the original transmitting end with time separations therebetween that are functions of the distance between the reflection devices and the velocity of propagation along the transmission line. Thus, assuming the utilization of devices that act to modulate the intensity of the source signal, the finite signal propagation velocity on a transmission line may be utilized to achieve time division multiplexing without using electrically active components.

Consider an optical fiber having a refractive index of 1.5 along which light propagates at a speed of $2 \times 10^8$ m/sec with a pulse dispersion of less than $10^{-9}$ sec for a specified length of fiber. Further consider reflecting devices coupled to this fiber with separations therebetween substantially equal to 0.1 m. Signals reflected from these devices may be resolved if an optical pulse with a $10^{-9}$ seconds duration (system bandwidth=1 GHz) is transmitted along the fiber to be incident to each reflecting device. Signal resolution may be maintained and the pulse width increased (system bandwidth decreased) if the separation between reflecting devices is increased, as for example, the separation of one meter will allow return pulses from the reflecting devices of substantially $10^{-8}$ seconds duration to be resolved.

Referring to FIG. 1, an optical passive time division multiplexing system 10 may include an optical source 11 an electrical pulse generator 12, an optical transmission line 13, which may be an optical fiber, coupled to receive pulses of optical carrier signals from the source 11 and a multiplicity of optical reflecting devices 14a through 14n which may be coupled to optical fiber 13 via couplers 15a through 15n respectively. A mirror 16 is positioned to deflect optical signals reflected from the transmission line 13 to a light detector 17. The electrical output of detector 17 is coupled to a demultiplexer 18 which is also coupled to receive pulses from pulse generator 12. Signals from the demultiplexer 18 are coupled therefrom to data detector 19, the output terminals of which are coupled to utilization devices not shown. Data detector 19 may include peak holding circuits and low pass filters.

Source 11 may comprise a cavity dumped Nd-YAG laser system operating at 1.06 microns which is pulse modulated by pulse generator 12 to emit a sequence of short duration light beams, of pulse width and duty cycle yet to be described, which may be incident to focusing lens 22 to be focussed through an appropriate aperture in the mirror 16 to be coupled to the optical fiber 13. Pulsed optical carrier signals coupled to the optical fiber 13 propagate therealong to be sequentially incident to optical directional couplers 15a through 15n. Though optical fibers can be manufactured to possess low optical attentuation characteristics they, however, exhibit dispersive characteristics that cause the time duration of the optical pulse to increase as the pulse propagates along the fiber. In multimode step index fibers the pulse dispersion is primarily a function of the variation of the refractive index of the fiber with optical wave length and the axial velocity of the optical signals incident to the fiber at angles within the finite range defined by the fibers numerical aperture. Wave length dispersion may be eliminated with the use of a monochromatic light source for generating the short duration light pulses. Though numerical aperture dispersion cannot be completely eliminated, it may be greatly reduced by manufacturing the fiber with a graded refractive index i.e. manufacturing the fiber such that the refractive index continuously decreases quadratically as the radial distance from the center increases. Graded index fibers possessing pulses dispersions less than one nanosecond per kilometer of propagation therein are commercially available. Thus, a useful bandwidth for a kilometer of graded index multi-mode fiber is 1 GHz and pulse resolutions in the order of one nanosecond may be achieved over a kilometer of graded index multimode fiber. It will be recognized by those skilled in the art that a 1 GHz bandwidth permits the multiplexing of 100,000 signals each having a bandwidth of 10,000 Hz.

Optical pulses propagating along the fiber 13 are sequentially coupled to optical reflectors 14a through 14n, which may be sensor elements of a sonar array, via optical directional couplers 15a through 15n. The couplers 15a through 15n may be of the type disclosed by Hill et al in a letter entitled "Efficient Power Combiner for Multiplexing Sources to Single Fiber Optical Systems", published in Applied Physics Letters volume 31 Dec. 1, 1977 and the optical reflectors 14a through 14n may be sensors of the type disclosed in U.S. Patent Application Ser. No. 63,504 entitled "Fiber Optic Transducer" filed by D. H. McMahon on Aug. 8, 1979 and assigned to the assignee of the subject invention. Optical pulses incident to each reflector device experience amplitudes variations in accordance with the variance of the reflection coefficient induced in the reflectors 14a through 14n. These amplitude modified optical pulses are directionally coupled to the fiber 13 to propagate towards the mirror 16, arriving thereat in the time sequence determined by the order and spacing of the optical reflectors 14a through 14n. This sequence of pulses commences with the returning pulse from reflector 14a which is followed in order by the return pulses 14b through 14n with time spacings $\tau$ therebetween substantially equal to 2 s/c, s being the spacing between directional couplers and c being the velocity of light in the fiber, when the length of the fibers 25a through 25n between the directional couplers 15a through 15n and the optical reflectors 14a and 14n respectively are substantially equal. The sequence of optical pulses returned to the end face 13a from the optical reflectors 14a through 14n for each transmitted optical pulse from source 11 are reflected by mirror 16 to detector 17 for conversion to a correponding sequence of electrical pulses. This sequence of electrical pulses may then be coupled to the input terminal 24 of the demultiplexer 18. Demultiplexer 18 has output terminals 18a through 18n each of which corresponds to one of the optical reflectors 14a through 14n. With each optical pulse emitted from source 11 demultiplexer 18 receives a pulse from pulse generator 12 and thereafter sequentially couples the input terminal 24 to one of the output terminals 18a through 18n so that each output terminal is coupled to the input terminal 24 once for each optical pulse emission. The timing sequence is arranged such that the electrical pulse derived from the optical pulse reflected by one of the optical reflectors 14a through 14n is coupled to the corresponding one of the output terminals 18a through 18n. This coupling sequence is repeated for each optical pulse emitted, thus a sequence of pulses of varying amplitudes consistent with the induced time-varying reflection coefficient of the reflectors, is coupled to each output terminal 18a through 18n of demultiplexer 18 establishing a data sample channel for each of the optical reflectors 14a through 14n. Each data sample channel is coupled to data detector 19 wherein the data in each channel is smoothed to eliminate the pulse repetition frequency and made available to a utilization device not shown.

The termination 23 of optical fiber 13 maybe a mirror from which the remaining pulse energy is reflected, detected by light detector 17 and coupled to output terminal 18m of demultiplexer 18 as an unmodulated sequence of pulses at the modulator pulse repetition frequency. Each pulse in this unmodulated sequence is the final return of the stream of reflected pulses resulting from an incident pulse to fiber 13 from source 11 and may be utilized, in some applications, to aid in compensating for optical signal losses at taps 14a through 14n and to resolve ambiguities caused by round trip time delays from reflectors positioned near the end of the fiber that exceed the period between optical pulses. In other applications these final returns are not required and the termination 23 of the optical fiber 13 may be a light absorbing material which absorbs substantially all optical energy incident thereto.

FIG. 2, wherein elements bear the same reference numerals as corresponding elements in FIG. 1, illustrates an embodiment of the invention which utilizes optical devices having variable optical transmission characteristics caused by mechanism sensitive to ambient changes. Pulsed optical carrier signals from source 11 may be focused by lens 22 through end face 31a to propagate along a first optical fiber 31. When the optical pulse arrives in the coupling region of directional coupler 32a, a portion of the pulse energy is coupled from the optical fiber 31 to a branch optical fiber 33a and propagates therealong to an optical transmission modulator 34a. The pulse incident to the transmission modulator 34a is coupled therethrough with an intensity that is a function of the instantaneous optical attenuation coefficient of the optical transmission device 34a to propagate along a second branch optical fiber 35a, from which it is coupled to a second main optical fiber 36 via directional coupler 37a to propagate to the end face 36a thereof. The optical pulse propagating along fiber 31 continues to propagate with reduced intensity beyond the coupling region 32a and upon arrival to the coupling region of directional coupler 32b a portion of the remaining pulse energy is coupled to transmission modulator 34b via fiber 33b and therefrom to optical fiber 36 via fiber 35b and directional coupler 37b to propagate towards the end face 36a. The optical pulse continues to propagate along fiber 31 with successively reduced intensity and is successively coupled from fiber 31 to fiber 36 at periodic position along the fiber 31 in the manner described until the last coupler-modulator combination is traversed. The optical energy remaining thereafter may either be absorbed in a termination 38 or may continue to propagate through a fiber 41 and be coupled therefrom to fiber 36 to propagate therealong as the final pulse in a sequence of pulses. The various couplings between fiber 31 and 36 cause a sequence of pulses to propagate towards the end face 36A of fiber 36 with spacings therebetween that are functions of the difference in the path lengths for each pulse. This sequence of optical pulses is incident from end face 36a to light detector 17 and the resulting electrical signal is subsequently processed by demultiplexer 18 and data detector 19 in the manner previously described.

Each of the directional couplers 32a through 32n and 37a through 37n may be of the type described by Hill et al. The transmissive modulators 34 through 34n, in one application of the invention, may be sensors in a sonar array with each being of the type disclosed in U.S. patent application Ser. No. 71,893 for Fiber Optic Transducer and A Method of Manufacture Therefor filed by R. L. Gravel on Sept. 4, 1979 and assigned to the assignee of the present invention.

This type of transducer transmits optical signals therethrough and provides an output signal intensity therefrom which is a function of the instantaneous pressure of the acoustic signal that is incident to the transducer.

Consider the data modulating elements 14a through 14n and 34a through 34n in FIGS. 1 and 2 respectively to be elements of a sonar array with uniform directional coupler spacings along the fiber and uniform element spacings in the water each equal to 0.1 meters. This spacing limits the highest acoustic wavelength that may be monitored without ambiguity to substantially 0.1 meters which, for a velocity of sound in water equal to $1.5 \times 10^3$ meters per second, corresponds to a maximum frequency of 15 KHz. Higher frequencies may be monitored by reducing the spacing of the transducers in the water and coiling or folding the fiber between the couplers to maintain the 0.1 spacing therebetween and concomitantly maintain the optical signal resolution previously described. The rate at which the sensors may be sampled without end of sequence processing, is determined by the the time delay along the fiber between the closest and farthest sensors from the light source. A transducer bandwidth of 10 KHz and a desired sampling rate of 100KHz limits the maximum array length L to $10^3$ meters ($L = (c/2f) = 2 \times 10^8 / 2.10^5$). This maximum array length may be increased to $5 \times 10^3$ meters if the sampling rate is reduced to the minimum rate of twice the transducer bandwidth, which is 20 KHz for this example.

Attention is now directed to an example of the invention wherein a linear fm signal is utilized to intensity modulate the light emission from a cw source. Referring to FIG. 3, the transmission and receiving systems of this embodiment may comprise a cw light source 41, such as a laser, a modulator 42, which may be of the electro-optic or acousto-optic type well known in the art, coupled to receive emissions from the source 41, an fm signal generator 43 coupled to an amplifier 44, the output terminal of which is coupled to provide a modulating signal to modulator 42 and an instantaneous local oscillator signal to a mixer 45. The electrical signal output of a light detector 46 is coupled to a second terminal of mixer 45, the output terminal of which is coupled to the input terminal of a filter bank 47. Filter bank 47 possesses a multiplicity of output terminals each of which is coupled to a corresponding input terminal of data detector 48.

A light beam emitted from the source 41 is incident to the modulator 42, the transmission characteristics of which are instantaneously altered in accordance with the linear fm electrical signal coupled thereto from fm generator 43, propagates therethrough and emerges therefrom with linear fm intensity modulation. The electrical signal coupled to the modulator 42 may be linear frequency modulated by a succession of ramp cycles 50 shown in FIG. 4. Each ramp cycle causes the light beam emitted from the modulator 42 to be intensity modulated with a linear fm envelop having continuous frequency variations between predetermined limits. This optical signal is coupled to be successively incident to the reflective or transmissive optical devices previously described, and the signals received therefrom are coupled to detector 46 from which an electrical signal representative of the incident optical signal is coupled to the second terminal of mixer 45. Each of these signals, though additionally data amplitude modulated, possess the same frequency variations as the modulation amplitude of the incident optical signal. Thus, the detected modulation frequency of each returned optical signal is a frequency vs time linear ramp function exhibiting a time delay that is substantially equal to the round trip propagation time for the device from which it was returned. These detected signals when mixed with the modulating signal from fm generator 43 will provide signals at frequencies representative of the respective time delays plus other signals including those produced by mixing the delayed signals with the retrace of the fm generator and the subsequent modulation ramp. As one skilled in the art will observe, the spurious signals due to mixing with the retrace and subsequent modulation ramp may be eliminated in variety of ways. One may eliminate ambiguities by coupling a gate signal generator 43a to receive frequency control voltages from fm generator 43 and to provide gate signals to the cw light source 41 which cause the source 41 to be on only during a preselected frequency interval of each ramp, as for example between the interval $f_L$ and the maximum modulation frequency fH, as shown in FIG. 4. The lower frequency $f_L$ is chosen to eliminate possible beats between the frequency ramp 51a detected from the last returned signal of a fm amplitude modulated incident optical signal and the subsequent amplitude modulating frequency ramp. To eliminate other spurious signals, a gate signal from gate signal generator may be applied to a gate 45a coupled between, mixer 45 and filter bank 47 so that beat frequencies are coupled to the filter bank only during the on-time of cw light source 41. It is understood by those skilled in the art that frequency sweep time T is very much longer than the maximum return time delay tm. Two delayed signal frequency variations 51a and 51b are shown in FIG. 4. With gate operation as previously discussed, signals with frequency variations 51a and 51b, when mixed with the frequency ramp signal 50 coupled from fm generator 43, produce signals 52a and 52b at constant frequencies $f_1$ and $f_2$ respectively.

For explanation purposes, consider a returned data modulated optical signal, as for example, the signal with the intensity modulation frequency variation 51a, is incident to the light detector 46 at a time $t_m$ after transmission of the optical signal with intensity modulation frequency variation 50. These signals, the modulation signal 50 and the detected modulation signal 51a, are coupled to mixer 45. Commencing at time tm and continuing until time T, the signal coupled from mixer 45 to the input terminal 49 of the filter bank 47 is the signal 52a at frequency $f_1$ shown in FIG. 4. Similarly, a previously returned fm amplitude modulated optical signal produces the signal 52b at frequency $f_2$.

Data modulation applied at each of the data modulators from which the frequency ramps 51a and 51b were returned is now applied to the two signals at frequencies $f_1$ and $f_2$. These signals are coupled to filter bank 47 which frequency demultiplexes signals coupled to the input terminals 49. The signals separated by the above method are coupled to output terminals 47a through 47n of filter bank 47, each of which corresponds to a sensor positioned along the optical fiber, and therefrom coupled to corresponding input terminals of data detector 48, wherein the modulated data from each data modulator is extracted and coupled to utilization devices not shown.

Applications of the invention may exist wherefor narrow pulse widths with extremely high peak intensities are required and a source capable of providing such pulses is not readily available. It is well known in the art that pulse energy may be increased for a constant peak power by increasing the pulse width. This, however, decreases the system resolution capability. Techniques, well known in the art, such as pulse compression, exist to provide a pulse of sufficient width with a limited peak intensity to transmit the required energy and after appropriate processing to provide the resolution of a narrower pulse width. FIG. 5 shows a system that may be employed in the present invention to accomplish pulse compression of pulsed optical signals. Referring to FIG. 5, a light source 81 is pulse modulated by modulator 82 to emit a sequence of light beam pulses to be incident to electrooptic modulator 83. Substantially concurrent with the coupling of a pulse to source 81, modulator 82 couples a trigger pulse to fm generator 84 initiating the generation of a linear fm signal which is coupled to electrooptic modulator 83 causing the instantaneous optical transmitting characteristics thereof to vary in accordance with the coupled linear fm signal. The light beam that emerges from electrooptic modulator 83 is amplitude modulated with the pulsed linear fm signal. The optical signal so modulated is incident to an optical fiber wherefrom it is successively coupled to data modulators and returned therefrom to be incident to light detector 85. Light detector 85 provides a sequence of linear FM pulses in response to the incident optical signals each with a pulse width substantially equal to the width of the pulse coupled from modulator 82 where within the frequency varies linearly with time substantially as the frequency variation within the fm signal coupled from fm generator 84. This sequence of linear fm pulses is coupled to a matched filter 86 which is well known in the art, has an impulse response that is the time inverse of each of the pulsed signals in the sequence coupled thereto. The output signal of the matched filter is a sequence of compressed pulses each with the pulse width that is consistent with the frequency bandwidth of the incident linear fm pulses. This sequence of compressed pulses is coupled to the time division demultiplexer 87 wherefrom they are channelized as previously described.

While the invention has been described in its preferred embodiments, it is understood that the words which have been used are words of description rather than of limitation and that changes may be made within the purview of the appended claims without departing from the true scope and spirit of the invention in its broader aspects.

I claim:

1. A multiple terminal passive multiplexing apparatus comprising:
   means for propagating modulated carrier signals in forward and reverse directions;
   sensor means sequentially positioned along and coupled to said propagation means for adding modulation representative of sensed data to said modulated carrier signals, thereby forming modified modulated carrier signals, said sensor means having reflective devices with reflection coefficients that are functions of external sources applied thereto whereby carrier signals propagating along said propagation means incident to said sensor means from said forward direction are reflected therefrom with instantaneous amplitudes representative of instantaneous values of said external sources establishing, for each modulated carrier signal, a sequence of time multiplexed modified modulated carrier signals propagating in said reverse direction;
   means coupled to receive said sequence of modified modulation carrier signals for detecting said modified modulations, thereby establishing a time division multiplexed sequence of signals having substantially modified modulation waveforms, said sequence of signals being in correspondence with said sequentially positioned sensor means; and
   demultiplexing means having a multiplicity of output terminals in correspondence with said sequence of sensor means for receiving said sequence of signals and coupling signals of said sequence of signals to corresponding output terminals.

2. A multiple terminal passive multiplexing apparatus comprising:
   first and second propagation means comprising means along which carrier signals may propagate in forward and reverse directions respectively;
   sensor means sequentially positioned along and coupled to said propagation means for adding modulation representative of sensed data to said modulated carrier signals, thereby forming modified modulation carrier signals, said sensor means including transmission means coupled between said first and second propagation means having transmission coefficients that are functions of external sources applied thereto whereby carrier signals propagating along said first propagation means and incident to said sensor means are transmitted therethrough with instantaneous modulations representative of instantaneous values of said external sources, establishing, for each modified modulated carrier signal, a sequence of time multiplexed modified modulated carrier signals propagating along said second propagation means in said reverse direction,
   means coupled to said second propagation means for receiving said sequence of modified modulated carrier signals and for detecting said modified modulations, thereby establishing a time division multiplexed sequence of signals having substantially modified modulation waveforms, said sequence of signals being in correspondence with said sequentially positioned sensor means; and
   demultiplexing means having a multiplicity of output terminals in correspondence with said sequence of sensor means for receiving said sequence of signals and coupling signals of said sequence of signals to corresponding output terminals.

3. An apparatus in accordance with claims 1, or 2 wherein said carrier signal is amplitude modulated by a sequence of pulses each with a pulse width that is no greater than twice the maximum separation between adjacent positions of said sequential positions divided by the propagation velocity along said propagation means.

4. An apparatus in accordance with claim 3 wherein said modulated carrier signals are amplitude modulated light signals and said propagation means are optical transmission lines.

5. An apparatus in accordance with claims 1, or 2 wherein said carrier signals are amplitude modulated by a modulating sequence of linear fm ramp signals, said detecting means providing a sequence of linear fm modulated ramp signals modified with modulation representative of sensed data in correspondence with said sensor means for each linear fm ramp in said modulating sequence, and said demultiplexing means comprises:
   means coupled to receive said modulating sequence of linear fm ramp signals and coupled to said output terminal of said detector means for mixing each linear fm ramp signal of said modulating sequence of linear fm ramp signals and said detected sequence of linear fm ramp signals therefor to provide signals at frequency differences therebetween at an output terminal thereof, said difference frequencies being in correspondence with said sensor means; and filter means having a multiplicity of output terminals each corresponding to a predetermined difference frequency and coupled at an input terminal to said output terminal of said mixer means for coupling signals at difference frequencies to said corresponding output terminals.

6. An apparatus in accordance with claim 5 wherein said modulated carrier signals are amplitude modulated light signals and said propagation means are optical transmission lines.

7. An apparatus in accordance with claims 1, or 2 wherein said carrier signal is amplitude modulated by a pulsed linear fm signal and further including filter means coupled between said detector means and said demultiplexing means to provide matched filtering to said pulsed linear fm signal for pulse compression thereby coupling a sequence of resolvable pulses to said demultiplexing means.

8. An apparatus in accordance with claim 7 wherein said modulated carrier signals are amplitude modulated light signals and said propagation means are optical transmission lines.

* * * * *